United States Patent [19]

Gabriele

[11] 4,058,999
[45] Nov. 22, 1977

[54] GEAR ROLLING EQUIPMENT

[75] Inventor: Leonard A. Gabriele, Warren, Mich.

[73] Assignee: Lear Siegler, Inc., Santa Monica, Calif.

[21] Appl. No.: 656,255

[22] Filed: Feb. 9, 1976

[51] Int. Cl.² .............................................. B21D 43/00
[52] U.S. Cl. ...................................... 72/102; 72/422; 90/72
[58] Field of Search ............................ 72/84, 102, 422; 29/159.2; 90/7.5, 72; 51/26, 286

[56] References Cited

U.S. PATENT DOCUMENTS

| 2,102,613 | 12/1937 | Cole | 90/72 X |
|-----------|---------|------|---------|
| 3,579,803 | 5/1971 | Lautenschlager | 29/159.2 X |
| 3,605,467 | 9/1971 | White et al. | 29/159.2 X |

Primary Examiner—Richard B. Lazarus
Attorney, Agent, or Firm—Whittemore, Hulbert & Belknap

[57] ABSTRACT

A machine for rolling hypoid gears, particularly ring gears, in mesh with a tool in the form of a hypoid gear. Work pieces are provided at a station with their teeth located in a precisely predetermined angular position. From this station they are transported into alignment with a rotary work spindle which at this time is fixed against rotation in a random position. The gear-like tool is secured to a spindle which is fixed in a precisely located angular position so that the teeth of the gear and tool are in proper angular alignment. The gear is fixed on the work spindle and the work and tool spindles are relatively moved to mesh the gear and tool, after which both spindles are released for rotation and one spindle is positively driven in rotation.

44 Claims, 12 Drawing Figures

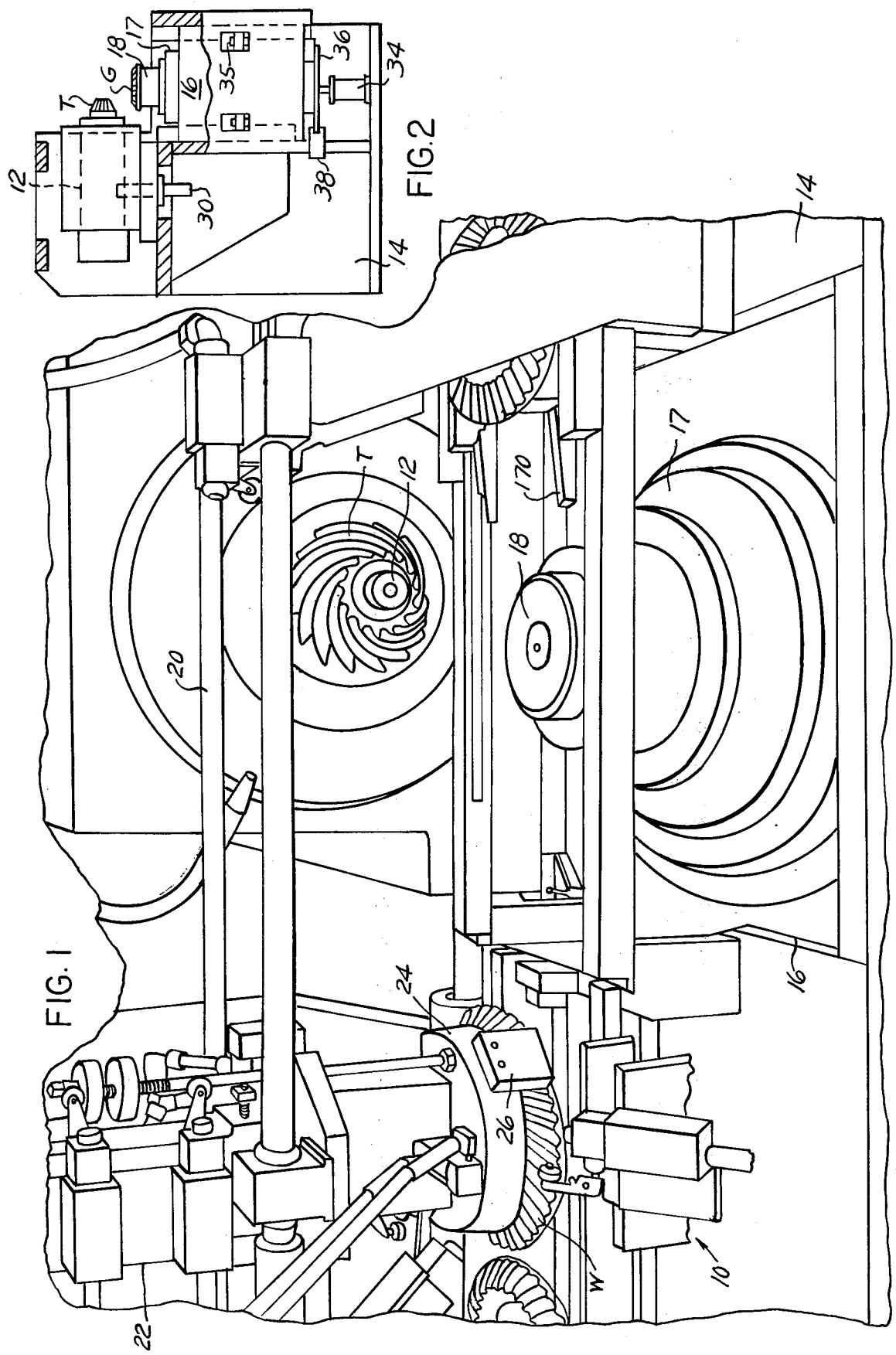

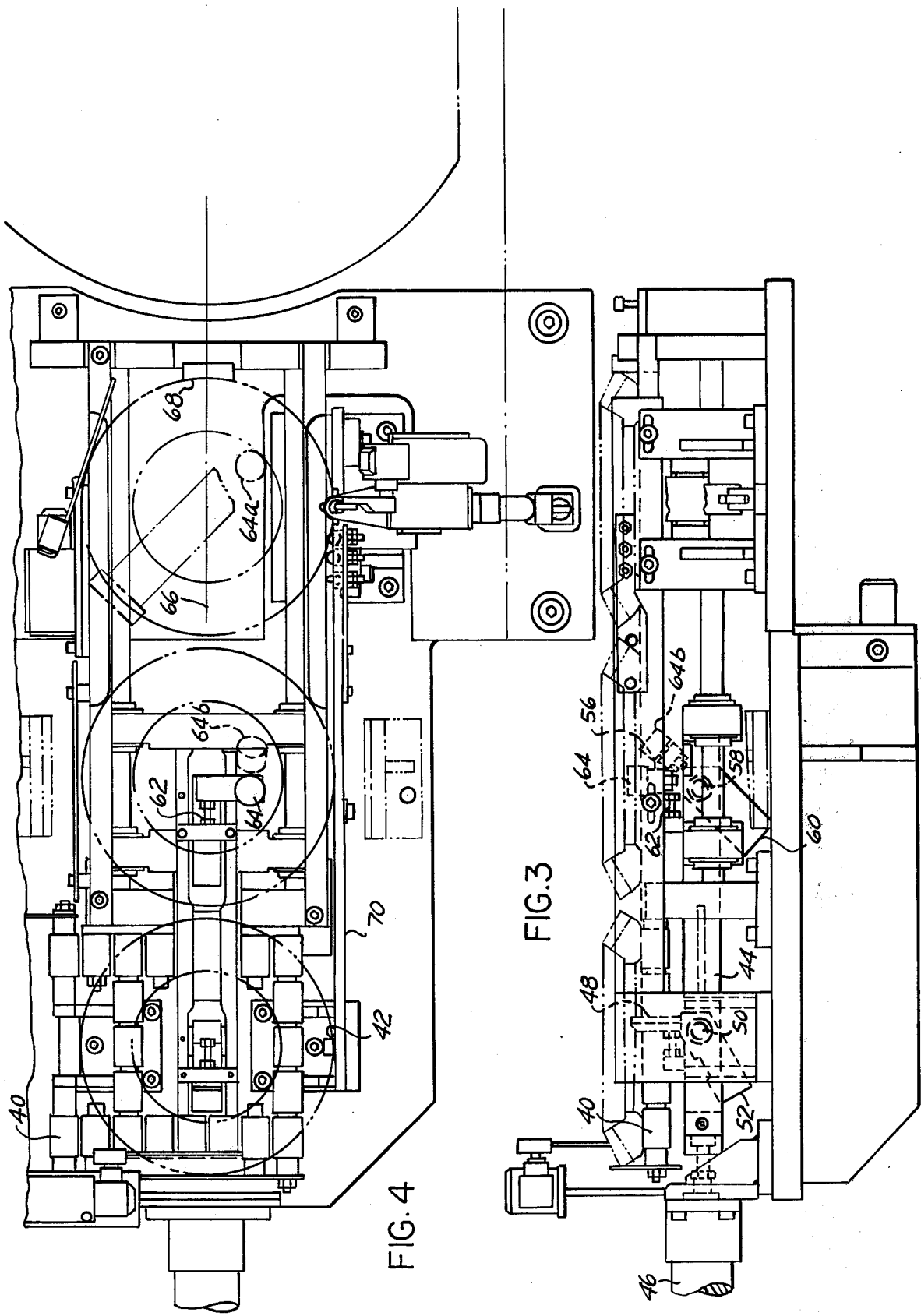

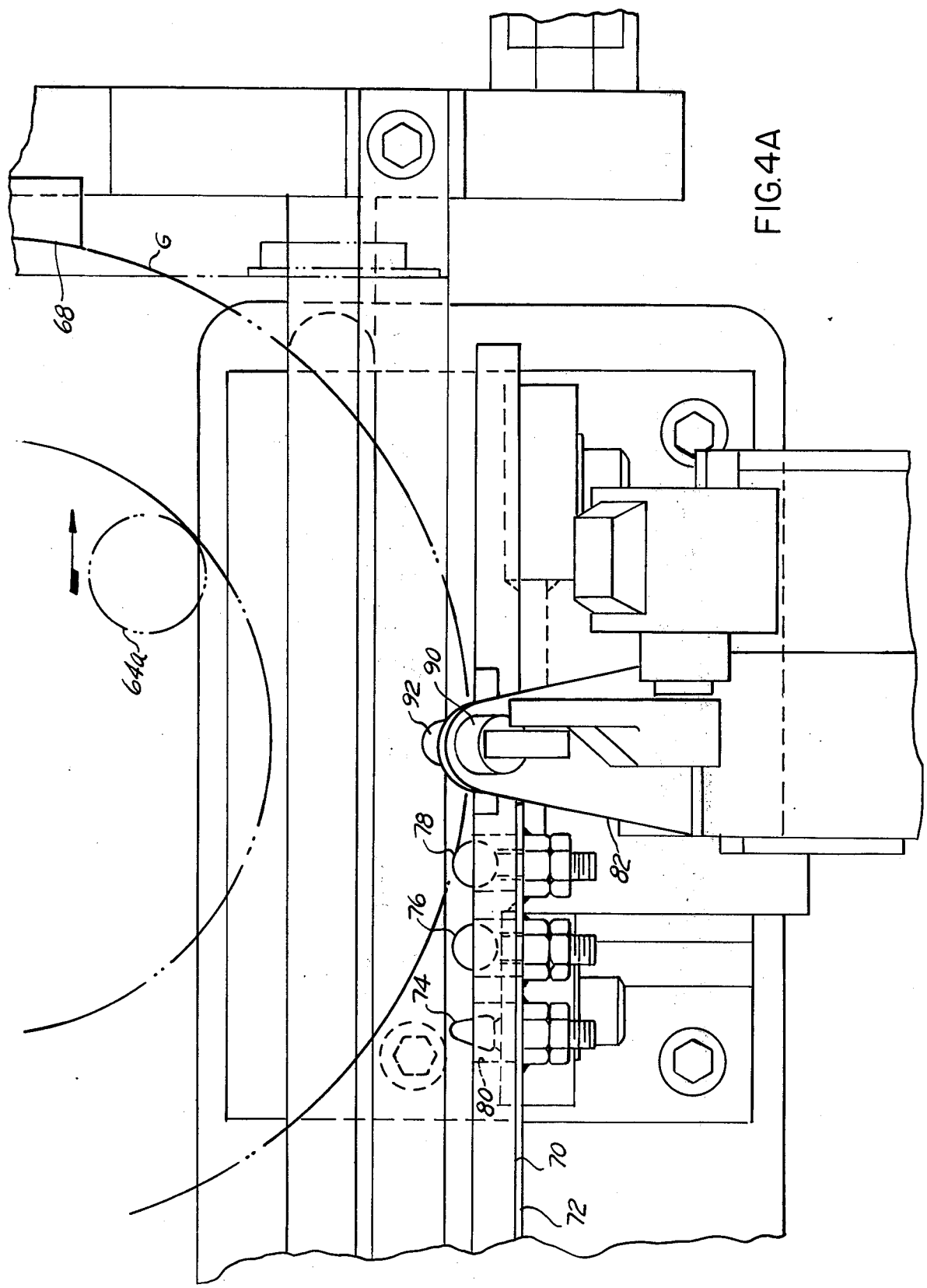

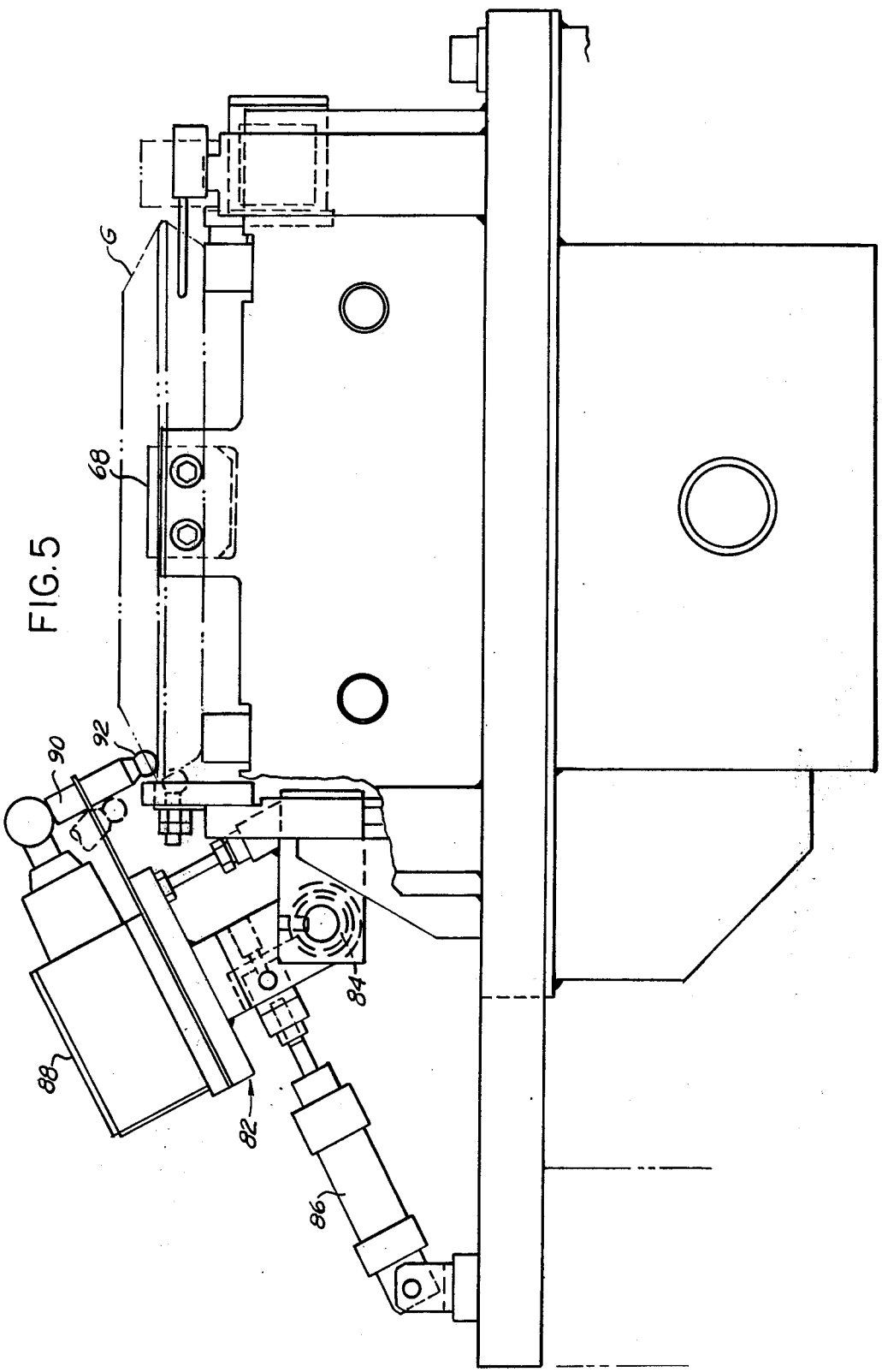

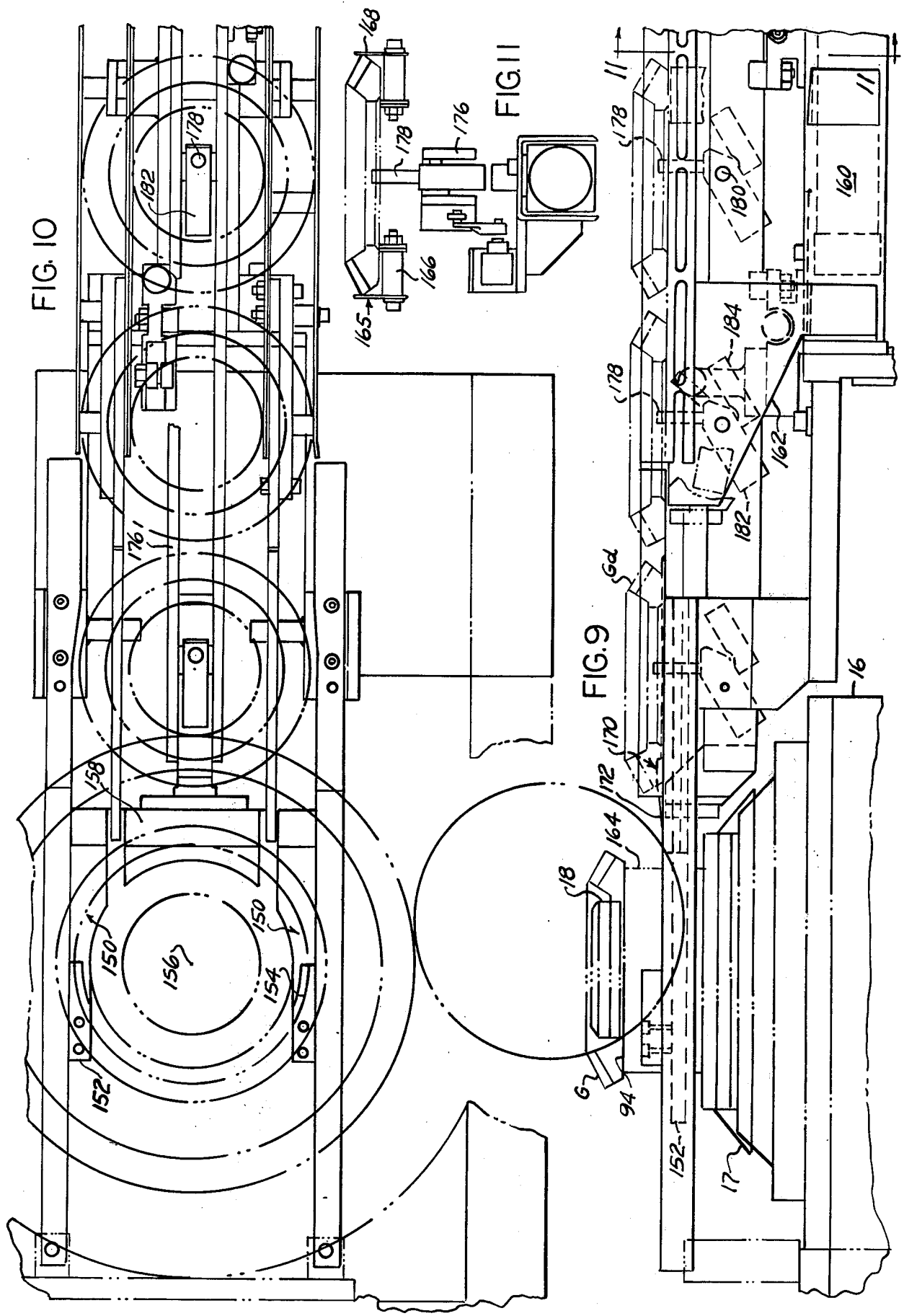

GEAR ROLLING EQUIPMENT

BRIEF SUMMARY OF THE INVENTION

The present invention relates to finish forming bevel gears, and particularly hypoid gears, by rolling them in mesh with a tool in the form of a bevel pinion. The tool is mounted on a rotary tool spindle and the work gear is mounted on a rotary work spindle. Means are provided for positively driving one of said spindles, preferably the tool spindle, in rotation and the meshed engagement between the gear and tool results in corresponding rotation of the work spindle.

During the rolling operation forces are applied to establish relatively heavy rolling pressure contact between the teeth of the gear and tool.

One of the problems in a machine as described in the foregoing is to provide automatic loading equipment in which unfinished work pieces may simply be fed into the machine and will advance continuously therethrough, entering into proper mesh with the tool gears, and finally being advanced from the machine on suitably formed exit rails. This loading equipment must provide for movement of the successive work gears into full mesh with the tool without the possibility of engagement between the crests of the teeth of the gear and tool and consequent failure to mesh.

Automatic meshing engagement during the automatic loading of the machine is accomplished by mounting the tool on a tool spindle in a fixed position thereon, and between gear rolling operations fixing the location of the tool spindle so that its teeth occupy precisely predetermined angular positions. Conveniently, this is accomplished by shot bolt means.

At the same time, after a finished work gear is removed from the work spindle, the work spindle is positively maintained in a random position as for example by the application of suitable brake means to the spindle in whatever position it happens to occupy at the conclusion of a gear rolling cycle.

Means are provided on the work spindle for fixing the work gear thereon against rotation so that the work gear is rotatable only with the work spindle after the brake means has been released.

In order to insure that the teeth of each work gear as it is located on the work spindle are in proper position to enter into full mesh with the teeth of the tool, means are provided for positioning each work gear as it advances in a fixed position in which its teeth are precisely mounted in the required angular position. This in general is accomplished by advancing each work gear along rail means into engagement with a series of resiliently mounted fingers which will enter into engagement in the tooth spaces of the work gear. Conveniently, these fingers may be mounted on a leaf spring so that if they fail to engage in the tooth spaces of the work gear, the fingers will be displaced against the spring until such time as they drop into the tooth spaces.

The individual work gears are advanced along the rails by a feeding abutment including the roller which engages the internal diameter of the gears in an off-center position located toward the side of the gears which will engage the locating fingers. This insures that the gear is biased toward the fingers as it advances. In the final position each gear encounters a locating abutment which determines its position in space while its angular position is determined by the tooth locating fingers as previously described.

At this time to provide final assurance that the gear is properly located, a ball type locator mounted on a pivoted lever is moved downwardly into engagement with a tooth space. If for any reason the ball point of the locator fails to enter a tooth space, suitable limit switch means controlled by position of the pivoted arm insures that further automatic operation of the machine is prevented until the difficulty is cured.

Having thus located a work gear in a precisely predetermined position in space and with the precisely predetermined angular position, the gear is now conveyed into axial alignment with the work spindle. Conveniently, the work spindle may include an expanding arbor which when contracted is adapted to receive the work gear upon relative axial movement between the spindle and the gear.

In the preferred embodiment of the invention each work gear after having been properly located as above described, is engaged between clamping jaws, which jaws are then elevated and transferred into position to align the gears with the work arbor. Preferably, the work gears are advanced with their axes vertical and the work spindle axis is so vertical. After the jaws advance the work gear into alignment with the spindle, the jaws lower the gear onto the spindle and hold it against rotation until the arbor is expanded to fix the gear thereon against rotation.

Thereafter, the jaws are retracted and the work spindle and tool spindle relatively moved to bring about meshing engagement between the work and tool. In the preferred form of the invention the tool spindle is maintained in a fixed horizontal position and the work spindle is elevated to bring the gear into appropriate mesh with the tool. After the tool and gear have been properly meshed, the shot bolt locator means is de-activated to release the tool spindle and the brake is deactivated to release the work spindle for rotation. One of the spindles, preferably the tool spindle, thereafter is driven in rotation at substantial speeds and the meshed engagement between the tool and gear bring about corresponding rotation of the work spindle.

Preferably, the work spindle is carried by a vertically movable slide which in turn is moved vertically by one or more hydraulic cylinders capable of establishing the relatively great rolling pressure required to finish the toothed surfaces of the work gears by a roll finishing operation.

After the rolling operation is completed the work spindle moved downwardly bringing the work gear out of mesh with the tool and after this meshing engagement is terminated the location of the tool spindle is again fixed by activation of the shot bolt means and the work spindle is fixed against rotation in a random position by activation of the brake.

Gear receiving means are provided movable into position at opposite sides of the work spindle while the work gear is being rolled which are adapted to receive the finished gear as it moves downwardly with the work spindle. At this time the expanding arbor is contracted so that as the arbor continues its downward movement the finished gear is stripped from the arbor and deposited on the gear receiving means.

The gear receiving means reciprocates and following deposit of a gear thereon it moves laterally from the axis of the work spindle to move the finished gear onto discharge rails where it joins other previously finished gears which are advanced in a step-by-step relation by pivoted fingers.

BRIEF DESCRIPTION OF THE DRAWINGS

FIG. 1 is a fragmentary perspective view showing the working station of the machine.

FIG. 2 is a diagrammatic representation of the major essential machine components.

FIG. 3 is a side elevation of the work loading station.

FIG. 4 is a plan view of the structure shown in FIG. 3.

FIG. 4A is an enlarged detail view of the work locating mechanism.

FIG. 5 is a fragmentary end view of the structure shown in FIG. 3.

FIG. 9 is an elevational view of the machine structure at the work spindle.

FIG. 10 is a plan view of the structure shown in FIG. 9.

FIG. 11 is a fragmentary end view substantially at the line 11—11, FIG. 9.

DETAILED DESCRIPTION

Figure 6:
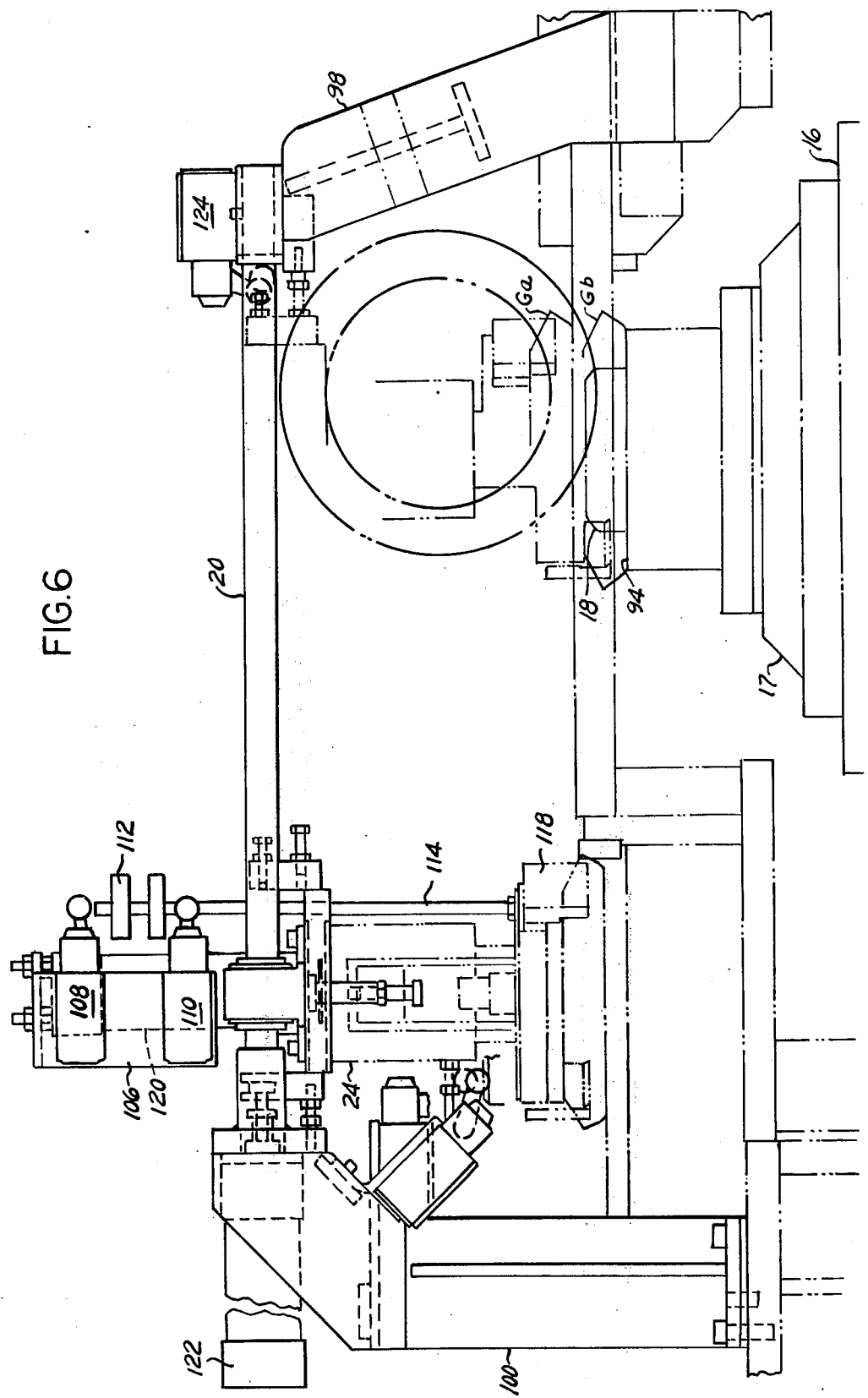
FIG. 6 is a fragmentary elevational view of the work transfer carriage and slide.

Referring first to FIGS. 1 and 2 the machine comprises a preliminary loading station indicated at 10 in FIG. 1 in which a work gear W is located in predetermined spatial relationship and in accurately determined rotational or angularly oriented position. The machine comprises a tool T fixedly mounted on a tool spindle 12 which is maintained in fixed spatial relation. The machine frame indicated generally at 14 comprises a vertically movable knee 16 including a work spindle 17 the upper end of which terminates in an expanding arbor 18.

Rails 20 are provided on which a carriage 22 is horizontally slidable. Mounted for vertical movement on the carriage 22 is a slide 24 having opposed clamping jaws, one of which is indicated at 26.

Referring now to FIG. 2 the tool T is fixedly mounted on the tool spindle 12 and is adapted to be driven in rotation by a motor 28, preferably a hydraulic motor. Between finishing cycles the tool spindle 12 is maintained in a precisely predetermined angular or rotational position by suitable means such for example as a shot bolt 30 adapted to enter into a recess in the tool spindle 12. This accordingly arrests the tool T in a predetermined angular position.

Mounted at the front of the machine is a vertically movable knee 16 in which the work spindle 17 is rotatable. The knee 16 is movable vertically by suitable means such as one or more hydraulic cylinder devices 34.

Suitable adjustable abutment means are provided for limiting the upward movement of the knee. Such means are diagrammatically indicated as adjustable abutment screws 35. In practice, four such abutments are provided and in the gear rolling operation these adjustable abutments determine the finish size of the gear. In other words, the upward force applied by the hydraulic piston and cylinder devices 34 will bring work gears G to the same size which is determined by the adjustment of the abutments 35, irrespective of some variation in size prior to rolling.

Fixed to the spindle 17 is a disc 36 associated with a friction brake 38 adapted to arrest the spindle 17 in a random position. The random position is any position in which the spindle 17 happens to come to rest between gear rolling cycles.

A succession of work gears awaiting roll finishing operations are provided on an inclined chute which is defined by gear supporting rollers 40 down which the gears advance by gravity into a position determined by engagement with an abutment 42 from which point they are advanced to the right as seen in these Figures.

A work advancing mechanism is provided comprising a bar 44 connected to a piston and cylinder device 46 for reciprocating the same. To the bar 44 a gear advancing pin 48 is pivoted, as indicated at 50 and includes a counterweight 52 which normally maintains the pin in its erected position against an abutment screw 54. Also connected to the bar 44 is a second gear advancing device comprising a finger 56 pivoted at 58 and including a counterweight 60 normally holding the finger 56 against abutment means indicated at 62. At the end of the finger 56 is a roller 64 engageable with the interior of a gear in an off-center position with respect to the center line 66 along which the gears advance. The off-center position of the roller is best indicated at 64a in FIGS. 4 and 4A where it is seen to engage within the annulus of the gear in the off-center position as illustrated.

On forward movement of the bar 44 the roller 56 is prevented from yielding by the abutment 62 but upon movement to the left of the bar 44 the finger 56 rocks to the position in which the roller 64 occupies the position indicated at 64b, thus leaving the gear in its advanced position.

When the work advancing mechanism operates to move a gear into finally located position, it advances the gear into engagement with a fixed abutment 68 which determines the spatial position of the gear. The means for determining its angular or rotational orientation is best illustrated in the enlarged fragmentary view of FIG. 4A. As seen in this Figure the gear G has been advanced into engagement with the stop or abutment 68 by the off-center roller 64a. As a result of the location of the roller the gear is not only advanced to the right as seen in the Figure, but is also given a lateral bias as well as forces tending to rotate the gear in a clockwise direction. It will of course be understood that the gear advances along a horizontal track or rails with its axis vertical preparatory to being positioned on an expanding arbor at the upper end of a vertical work spindle.

The advancing work gear is advanced along a side rail 70 to which is attached one end of a leaf spring 72 carrying a plurality of adjustable fingers 74, 76 and 78. It will be observed that finger 74 has a shape corresponding to a tooth space of the gear, whereas the fingers 76 and 78 are ball shaped. The fingers extend through openings 80 in the rail 70 in position to be engaged by teeth at the periphery of the gear G. When the gear comes into engagement with the stop abutment 68 it will have been rotated into the correct angular or rotational orientation by the fingers 74, 76 and 78.

As a final assurance that the work gear is in prperly oriented position the mechanism illustrated in FIGS. 4A and 5 is provided. Here, it will be seen that there is provided a lever 82 pivoted as indicated at 84 and adapted to be swung about the pivot axis by means of a piston and cylinder device 86. Mounted on the lever 82 is a limit switch 88 adapted to be engaged by a plunger 90 having a ball tip 92 adapted to enter into the space between teeth of the gear G if the gear is precisely oriented in predetermined angular position. If the ball point 92 happens to engage on the crest of the tooth or fails to enter fully into a tooth space, the limit switch 88 is connected to terminate further automatic operation of the machine.

Figure 7:
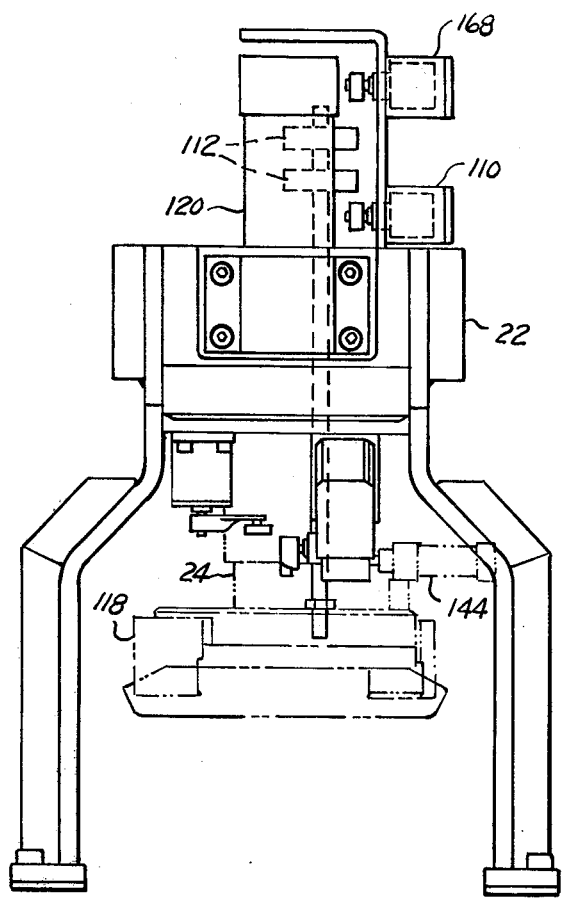
FIG. 7 is an end view of the structure shown in FIG. 6.
Figure 8:
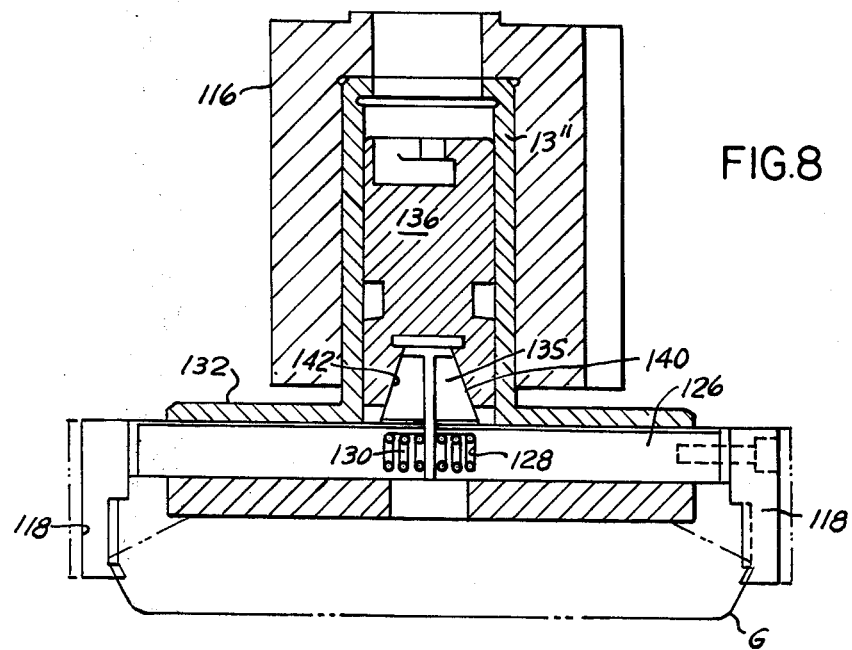
FIG. 8 is an enlarged sectional view of the work clamp mechanism.

Referring now to FIGS. 6, 7 and 8 there is illustrated the mechanism for gripping the gear in its predetermined angular position and moving it into alignment with the work spindle of the machine.

In FIG. 6 the vertically movable knee 16 and work spindle 17 of the machine are illustrated and the spindle at its upper end is provided with an abutment surface 94 and the expanding arbor 18. Separated posts 98 and 100 are provided which at their upper ends carry the rails 20 along which the carriage assembly 22 is movable to the right and left as seen in FIG. 6. The carriage has an upwardly extending bracket 106 carrying limit switches 108 and 110 actuated by abutments 112 on a vertically movable rod 114. Vertically movable on the carriage 22 is a slide 24 carrying clamping jaws 118 at its lower end. The bracket 106 carries a piston and cylinder device 120 to which the slide 24 is connected and the carriage 22 is connected to a piston and cylinder device 122 adapted to move the carriage 22 from the full line position illustrated in FIG. 6 to the right, to a position in which it actuates a limit switch 124. The right hand position of the carriage 22 moves the work gear G to the position indicated in dotted lines at Ga, after which downward movement of the slide 24 moves the gear downwardly to the position Gb in which it abuts the surface 94 and receives the expanding arbor 18 within the central opening therein.

Referring now particularly to FIG. 8 there is illustrated the mechanism for actuating the clamping jaws 118. The jaws 118 are each secured to rods 126 the inner ends of which confront each other and are provided with recesses 128 receiving the ends of a compression spring 130 normally urging the jaws away from each other into gear releasing position. Rods 126 are longitudinally slidable in a bore provided in a head 132 at the lower end of the slide 116. A cylinder 134 is provided in which a piston 136 is vertically movable. The rods 126 at their inner ends are provided with upstanding ears 138 having inclined camming surfaces 140. The lower end of the piston 136 has a recess 142 having correspondingly inclined surfaces engageable with the surfaces 140. When pressure fluid is admitted above the piston 136 the piston is moved downwardly and cams the rods 126 inwardly to clamp the jaws 118 against the periphery of the work gear G. A piston and cylinder device 144 includes a cam (not shown) which retains the jaws clamped during transfer.

As best illustrated in FIG. 6 the jaws 118 are located to have a line of action extending diagonally with respect to the center line of advance of the gears so as to avoid interference with the remaining machine structure.

After a work gear has been deposited on the expanding arbor 18 of the work spindle 17, the arbor is expanded so that the work gear is securely retained thereon against rotation. At this time the friction brake prevents rotation of the work spindle and accordingly, the work gear maintains its precise required rotational orientation with respect to the tool or die, which of course also remains in fixed position at this time as a result of actuation of the shot bolt.

At this time the knee 16 is elevated and the teeth of the tool T and gear G enter into mesh. As soon as this has been accomplished the shot bolt and brake are deactivated so that both work and tool spindles are rotatable and the motor 28 is activated to initiate power rotation of the tool spindle. At the same time continuous pressure is applied to the knee 16 to raise it until further advance is arrested by engagement of the adjustable abutments 35 previously referred to.

This completes the rolling operation and thereafter the knee is lowered.

Referring now to FIGS. 9-11 there is illustrated the mechanism which strips the finished gear from the expanding arbor and advances it to a discharge chute for step-by-step further advance.

The finished work gear G is illustrated in FIG. 9 as supported on the surface 94 of the work spindle 17 and upon downward movement of the knee 16 the gear G will be engaged on support surfaces 150 of a pair of nest members 152 having abutment surfaces 154 engageable with surfaces on the work gear G to the left of its center line designated at 156 in the Figure. Nest members 152 are connected to a transverse bar 158 which in turn is connected to a piston and cylinder device 160 by a bracket 162. It will be observed that the nest members 152 are spaced apart to extend at opposite sides of the reduced portion 164 at the upper end of the work spindle and are movable by the piston and cylinder device 160 from the positions illustrated in FIG. 10 to the right to a position in which they permit downward movement of an unfinished gear onto the expanding arbor 18 when the knee 16 is in its lowermost position.

Discharge movement of the finished gears as seen in FIGS. 9 and 10 is to the right, and for this purpose there is provided a trackway or chute indicated generally at 165, as best illustrated in FIG. 11, comprising spaced rollers 166 and vertically extending guard rails or flanges 168.

With the parts in the position illustrated in FIG. 9, downward movement of the knee 16 will cause the finished gear G to be deposited on the support surfaces 150 and to have trailing surfaces thereof engaged by the abutment surfaces 154 on nest members 152. At this time of course the expanding arbor 18 is contracted so that downward movement of the knee 16 strips the finished gear G from the expanding arbor and leaves it supported on the nest members 152.

At this time the piston and cylinder device 160 is actuated moving the nest members 152 to the right to displace the gear from its position overlying the work spindle 17 preparatory to the placement of a following work gear thereon. The finished gear is advanced onto the beginning of the trackway or discharge chute indicated generally at 165. In order to prevent retrograde movement of a finished gear after it has been removed from alignment with the work spindle, a stop 170 is provided having an inclined upper surface 172 and a stop shoulder 174 engageable with the trailing bottom corner of a work gear. The finished gear thus occupies the position designated in FIG. 9 as Gd, at which time it is prepared for further advance to the right by reciprocation of longitudinally extending bars 176 between which are pivoted feed dogs or fingers 178, the pivot means being indicated at 180. The pivoted dogs are provided with a counterweight 182 normally maintaining the dogs or fingers 178 erect, in which position they are maintained against counterclockwise rotation by an abutment 184. The dogs 178 extend upwardly within the annulus of the gears G and are thus effective to move them to the right by an amount equal to the stroke of the bars 176, which are connected to the piston and cylinder device 160 for accomplishing step-by-step advance of the finished gears.

From the foregoing it will be observed that finished gears are removed from the working zone by downward movement of the knee with the expanding arbor in contracted position so that the finished gears are deposited on the transfer means which includes the nest members 152. As soon as the finished gears are separated from the expanding arbor the nest members are shifted to the right, transferring the finished gears to the entry end of the discharge chute 165 in which position they are retained by engagement with the abutment shoulder 174 as the transfer device including the laterally spaced nest members 152 are returned to position at opposite sides of the reduced portion 164 of the work spindle. Reciprocation of the bars 176 causes a step-by-step advance of physically separated gears as a result of engagement of the feed dogs 178. On movement to the left of the bars 176 the dogs 178 pivot clockwise to clearance position and are moved rearwardly for engagement with the next successive finished gear.

It will be observed from the foregoing that essentially the machine comprises means for effecting automatic loading including meshing between a work gear and a gear-like tool in which the tool is maintained against rotation in a precisely predetermined position of angular orientation, while the work spindle is retained against rotation in a purely random position. A work gear is advanced to a preliminary loading position and its rotational or angular orientation is precisely predetermined so that as long as this angular position is maintained, it is capable of moving directly into mesh with the tool or die without interference between the teeth thereof. At this time the work gear is transported without disturbing its rotational position into alignment with the axis of the work spindle and is then engaged upon the work spindle against rotation while the work spindle is maintained in its random rotational position. Thereafter, relative movement between the work spindle and tool spindle in a direction parallel to one of such spindles causes meshing engagement between the gear and tool. After this meshing engagement has been brought about the two spindles are released for rotation and one of them is positively driven in rotation while forces are applied tending to produce relative motion between the spindles in a direction which will establish an effective rolling pressure between the surfaces of the teeth of the gear and tool. This rolling pressure is sufficient to displace material at the teeth of the gear and is continued until the relative motion is terminated by engagement of rigid abutments, thus insuring roll finishing of the gears to identical size even though minor variations may exist prior to rolling.

Referring to FIG. 2, it will be observed that the directions in which the axes of tool spindle 12 and the work spindle 17 extend are fixed in space. Thus, tool spindle 12 is horizontal at all times and in FIG. 2 extends parallel to the plane of the Figure. Similarly, work spindle 17 is vertical at all times and in FIG. 2 extends parallel to the plane of the drawing. Since the gearing being rolled is hypoid, the axes of the gear and tool are laterally offset in the manner of operating hypoid gearing. The work gear G and its spindle 17 are movable vertically to mesh the gear and tool and to apply rolling pressure, but this movement is along the axis of work spindle 17 and hence does not disturb its orientation in space.

In the foregoing reference is made generally to bevel gearing and it is to be understood that this includes hypoid gearing, for which the rolling operation is primarily intended. In the hypoid rolling the pinion element, whether the tool or gear, is located so that its axis is offset laterally from the axis of the gear member.

The rolling operation is carried out so that the complete finish rolling of a gear including the loading and unloading is accomplished in a brief interval as for example ten to twenty seconds. The operation is fully automatic and it is necessary only to see that the inclined loading chute is provided with a supply of unfinished gears, and to remove or provide means for receiving the finished gears from the discharge end of the discharge chute 165.

Reference is made herein to positioning or maintaining the work and/or tool gears in alignment. This is understood to mean position the gear members as illustrated herein with their axes perpendicular and so positioned that by relative rectilinear movement without rotation they move directly into mesh without tooth interference. Obviously, the relative approach might equally well be arcuate, as by swinging the work gear into mesh on an arm pivoted on a fixed axis. Similarly, if the gears are cylindrical, their axes will be parallel to each other.

Reference is made herein to a work spindle and a tool spindle. The term "spindle" is to be understood to have its usual meaning in the machine tool industry, namely, a rotatable member having an axis of rotation on which a tool or workpiece is mounted.

I claim:

1. Apparatus for roll finishing an annular toothed work gear having an axis of rotation and a central opening coaxial therewith by rolling in tight mesh with a toothed tool gear conjugate to the work gear, which apparatus comprises a rotary tool spindle having an axis of rotation and means on said tool spindle for mounting a tool gear thereon in fixed angular position relative to said tool spindle, mounting means for said tool spindle mounting said tool spindle for rotation about its axis while maintaining the direction of its axis fixed in space, selectively operable means for fixing said tool spindle against rotation relative to its mounting means in a predetermined angular position, a rotary work spindle having an axis of rotation and a work support portion having a part receivable in the central opening of a work gear and adapted to retain a work gear against rotation on said work spindle and to sustain forces developed by rolling the work gear and tool gear in tight mesh under high pressure, mounting means for said work spindle mounting said work spindle for rotation about its axis while maintaining the direction of its axis fixed in space, the direction of the axis of said work spindle being related to the direction of the axis of said tool spindle such that upon relative movement between said work and tool spindle mounting means resulting in direct approach without rotation between a tool gear and work gear carried respectively by said tool and work spindles, the gears may move into a fully meshed relation, selectively operable means for fixing said work spindle relative to its mounting means against rotation in a random angular position in loading position, means for locating successive work gears in spaced relation to the work support portion of said work spindle while said work spindle is in loading position, and with the axes of rotation of each work gear in alignment with the axis of rotation of said work spindle and in a predetermined angular rotational position such that the teeth of the work gear and tool gear will mesh upon direct approach therebetween, means for effecting relative movement between a work gear and said work spindle while maintaining both said work spindle and the work gear against rotation about their axes to position the work gear on said work spindle in the aforesaid angular rotational position, selectively operable means for fixing the work gear on said work spindle against rotation thereon to maintain its predetermined angular position, means for effecting relative movement between said work and tool spindle mounting means while both of said spindles are maintained against rotation to cause direct approach between the work and tool gears to bring the gears into tight mesh, means for thereafter releasing both of said spindles for rotation, the means for effecting relative movement between said work and tool spindle mounting means being operable to provide additional relative movement therebetween to establish rolling pressure between the teeth of the gears, and means for driving one of said spindles in rotation.

2. Apparatus as defined in claim 1, in which the aforesaid means for locating successive work gears comprises means for initially locating a work gear in predetermined angular rotational position and spaced laterally from the work spindle and transfer means engageable with the work gear to maintain its angular rotational position and movable transversely of the work spindle axis to position a work gear carried thereby in axial alignment with the work spindle, and in which the aforesaid means for effecting relative movement between the work gear and work spindle to position the work gear on said work spindle provides relative axial movement between said work gear and work spindle.

3. Apparatus as defined in claim 2 in which the transfer means comprises a carriage movable transversely of said work spindle, and the means for effecting relative axial movement between the work piece and work spindle comprises a slide movable on said carriage in a direction parallel to the axis of said work spindle.

4. Apparatus as defined in claim 3 in which the means for fixing the work piece on said work spindle comprises an expanding arbor.

5. Apparatus as defined in claim 3 in which the means for effecting relative movement between said work and tool spindles to bring the gear and tool into mesh comprises a piston and cylinder device connected to said work spindle mounting means for moving said work spindle axially.

6. Appartus as defined in claim 5, and in which the means for applying a force sufficient to produce roll finishing pressure comprises said piston and cylinder device.

7. Apparatus as defined in claim 1 in which the selectively operable means for fixing the tool spindle against rotation relative to its mounting means comprises shot bolt mechanism.

8. Apparatus as defined in claim 1 in which the selectively operable means for fixing the work spindle against rotation relative to its mounting means comprises friction means.

9. Apparatus as defined in claim 1 in which said tool spindle occupies a fixed position in which its axis is horizontal, and the axis of said work spindle is vertical and said work spindle is vertically movable.

10. Apparatus as defined in claim 9 in which said work spindle mounting means is vertically upwardly movable to mesh the work and tool gears and to establish rolling pressure therebetween and is vertically downwardly movable to disengage the work and tool gears for unloading, comprising in addition unloading means including gear support means movable into position beneath a finished work gear prior to downward movement of said work spindle following a rolling operation and engageable with the finished gear to strip the gear from said work spindle, and means for moving said unloading means laterally into position beneath the work gear to receive the rolled gear and for moving said unloading means laterally away from said work spindle to carry the finished gear away from the work spindle.

11. A machine for rolling annular bevel gears by rotation in tight mesh under pressure which comprises
a frame,
a knee vertically movable on said frame,
power feed means interconnecting said frame and knee,
a rotatable work spindle on said knee having a vertical axis of rotation and movable vertically with said knee,
an expanding work support arbor at the upper end of said work spindle extending above said knee to support a work ring gear for rotation and vertical movement with said work spindle,
brake means connected between said knee and vertical work spindle to retain said work spindle against rotation in a random rotational position when said brake means is activated,
a rotatable tool spindle having a horizontal axis of rotation carried by said frame to position a bevel gear-like pinion above a bevel ring gear on said arbor,
drive means in said frame for driving said tool spindle in rotation,
positive locating means acting between said frame and tool spindle operable when activated to retain said tool spindle and a gear-like tool affixed thereto in precisely predetermined rotational position,
means defining a loading station for positioning a ring gear work piece in precisely predetermined position with its axis parallel to but spaced laterally from the axis of said work spindle,
means for advancing work gears serially to said loading station,
orienting means operable during advance of a work gear into said loading station to rotate the gear into and to retain the gear in precisely predetermined rotational position,
a carriage mounted on said frame for horizontal movement between pick-up and loading positions,
a vertically movable slide on said carriage,
work gripping jaws on said slide, means for moving said carriage from said pick-up position in which said jaws are in vertical alignment with a work gear at said loading station to a loading position in which said jaws are in vertical alignment with said arbor, means for moving said slide vertically on said carriage to move said jaws downwardly into position at opposite sides of a work gear at said loading station when said carriage is in pick-up position, to move said jaws upwardly after clamping of a work gear by said jaws, to move said jaws downwardly when said carriage is in loading position to position the work piece in proper rotational position on said arbor, and to move said jaws upwardly after releasing a work gear at said working station, means for actuating said jaws in clamping direction when in juxtaposition to a work gear at said pick-up position, and for actuating said jaws in release direction when the work gear carried by said jaws has been engaged by said expanding arbor, means for actuating said power means to move said knee to engage a work gear on said arbor in meshed relation with a tool on said tool spindle, means for thereafter de-activating said positive locating means to release said tool spindle for rotation and for de-activating said brake means to release said work spindle and arbor for rotation, and means for operating said drive means and said power feed means to finish the tooth surfaces of the work gear by pressure rolling contact with teeth surfaces of the tool.

12. A machine as defined in claim 11 in which said locating means comprises shot bolt mechanism.

13. A machine as defined in claim 11 in which said orienting means comprises a slideway along which work gears are slidable, resilient means at the side of said slideway and supporting a plurality of tooth engaging fingers adapted to enter tooth spaces at one side of an advancing work gear, a cooperating support surface extending along said slideway in position to engage the other side of an advancing work gear, and an abutment surface extending transversely of said slideway to terminate sliding movement of a work gear in precisely predetermined location, and advancing means for advancing an annular work gear along said slideway.

14. A machine as defined in claim 13 comprising means engageable within the annulus defined by the ring gear for advancing the gear along said slideway.

15. A machine as defined in claim 14 in which said means is positioned to engage the gear to the side of the center line along which the gear advances where said fingers are located.

16. A machine as defined in claim 14 in which the means engageable with the annulus of the ring gear comprises a feed finger reciprocable along said slideway and pivotally mounted for movement between a position with the annulus, and a retracted position which provides for movement thereof along said slideway for engagement with a succeeding gear.

17. A machine as defined in claim 11, which further comprises unloading means for engaging and supporting a finished gear in a fixed position removed from the tool as said arbor is moved away from the tool to strip the finished gear from said arbor, and means for moving said unloading means laterally out of alignment with said arbor preparatory to placement of the next succeeding gear on said arbor.

18. A machine as defined in claim 17 in which said means for engaging and supporting the finished gear comprises spaced support elements movable between a first position in which they surround said arbor and underlie a finished gear, and a second position spaced laterally from said first position.

19. A machine as defined in claim 18 in which said elements are provided with gear engaging abutments engageable with a gear deposited on said elements upon release from said arbor, and rails onto which finsihed gears are advanced upon movement of a finished gear by said elements.

20. A machine as defined in claim 19 comprising a slide reciprocable longitudinally of said rails, tiltable fingers on said slide spaced to individually engage in the annulus of a finished gear, said fingers being tiltable by engagement with a gear upon return movement of said slide to move from one of the finished gears to the following one of a series thereof and to advance all of the finished gears upon forward movement of said slide.

21. A machine as defined in claim 17 in which said locating means comprises shot bolt mechanism.

22. A machine as defined in claim 21 in which said orienting means comprises a slideway along which work gears are slidable, resilient means at the side of said slideway supporting a plurality of tooth engaging fingers adapted to enter tooth spaces at one side of an advancing work gear, a cooperating support surface extending along said slideway in position to engage the other side of an advancing work gear, and an abutment surface extending transversely of said slideway to terminate sliding movement of a work gear in precisely determined location, and advancing means for advancing an annular work gear along said slideway.

23. A machine as defined in claim 22, comprising means engageable within the annulus defined by the ring gear for advancing the gear along said slideway.

24. A machine as defined in claim 23 in which the means engageable within the annulus of the ring gear comprises a feed finger reciprocable along said slideway and pivotally mounted for movement between a position with the annulus, and a retracted position which provides for movement thereof along said slideway for engagement with a succeeding gear.

25. A machine as defined in claim 11 which comprises adjustable abutment means acting between the frame and knee to serve as a positive stop for the knee to determine final size of the rolled gear.

26. A bevel gear rolling machine comprising a frame, a tool spindle rotatably mounted on said frame including means for fixedly supporting a tool in the form of a bevel gear thereon, a work spindle rotatably mounted on said frame for supporting a bevel work gear, releasable means on said work spindle for positively gripping a work gear against rotation relative to said work spindle, means for arresting said tool spindle in a predetermined rotational position for a loading operation between successive finishing operations, means cooperating with one of said spindles for driving it in rotation during a gear finishing operation, means mounting said other spindle for free rotation whereby said other spindle is driven in rotation through the meshed engagement of a gear and tool upon rotation of said one spindle during a finishing operation, means operable between successive finishing operations to terminate rotation of said work spindle in a random position and to prevent rotation thereof until meshed engagement of the tool and a gear for a successive finishing operation, means operable while said work spindle is retained in said random position to position a work gear on said work spindle in a predetermined rotational position such that the work gear will mesh with a tool gear on said tool spindle upon relative movement without rotation between said spindles to cause approach between the gears carried thereby, means for moving one of said spindles without rotation between a loading position in which a gear carried thereby is spaced from a gear carried by said other spindle and a working position in which the gears are in mesh, and for thereafter applying a force to said one spindle to establish a gear finishing pressure between tooth surfaces of such gears.

27. A machine as defined in claim 26 in which the means for arresting said tool spindle comprises shot bolt means.

28. A machine as defined in claim 26 in which the means for terminating rotation of said work spindle in random position comprises a friction brake.

29. A machine as defined in claim 27 in which the means for terminating rotation of said work spindle in random position comprises a friction brake.

30. Automatic positioning and loading structure for mounting a succession of annular bevel ring work gears on the rotatable work support arbor of a machine in which said arbor has an axis of rotation and is fixed against rotation in a random rotational position, during loading, in predetermined oriented rotational position relative to a gear-like die in precisely predetermined fixed rotational position and for removing finished gears from the arbor and depositing them at an unloading station, comprising a loading station, means for advancing a gear to said loading station with its axis parallel to but spaced laterally from said arbor, rotational position locating means operable on the gear to provide predetermined rotational location thereof at said loading station, a carriage movable in a direction perpendicular to the axis of said arbor, a slide on said carriage movable thereon in a direction parallel to the axis of the arbor, jaws on said slide, means for positioning said carriage and slide in a position in which said jaws are disposed at opposite sides of a work gear at said loading station, means for clamping said jaws against the work gear to hold it against rotational displacement, means for moving said slide on said carriage for disengaging the work gear from said rotational position locating means, means for moving said carrier to position the work gear in axial alignment with the axis of said arbor for mounting thereon by relative axial movement between the work gear and arbor, and means for thereafter unclamping said jaws to release the work gear for rotation with the arbor.

31. Structure as defined in claim 30 in which said locating means comprises a slideway along which work gears are slidable, resilient means at the side of said slideway and supporting a plurality of tooth engaging fingers adapted to enter tooth spaces at one side of an advancing work gear, a cooperating support surface extending along said slideway in position to engage the other side of an advancing work gear, and an abutment surface extending transversely of said slideway to terminate sliding movement of a work gear in precisely determined location, and advancing means for advancing a succession of annular work gears along said slideway.

32. Structure as defined in claim 31, comprising means engageable within the annulus defined by the ring gear for advancing the gear along said slideway.

33. Structure as defined in claim 32 in which the means engageable within the annulus of the ring gear comprises a feed finger reciprocable along said slideway and pivotally mounted for movement between a position with the annulus, and a retracted position which provides for movement thereof along said slideway for engagement with a succeeding gear.

34. Structure as defined in claim 30 which further comprises means for engaging and supporting a finished gear in a fixed position removed from the tool as said arbor is moved away from the tool to strip the finished gear from said arbor, and means for moving said gear laterally out of alignment with said arbor preparatory to placement of the next succeeding gear on said arbor.

35. Structure as defined in claim 34 in which said means for engaging and supporting the finished gear comprises spaced support elements movable between a first position in which they surround said arbor and underlie a finished gear, and a second position spaced laterally from said first position.

36. Structure as defined in claim 35 in which said elements are provided with gear engaging abutments engageable with a gear deposited on said elements upon release from said arbor, and rails onto which finished gears are advanced upon movement of a finished gear by said elements.

37. Structure as defined in claim 36, comprising a slide reciprocable longitudinally of said rails, tiltable fingers on said slide spaced to individually engage in the annulus of a finished gear, said fingers being tiltable by engagement with a gear upon return movement of said slide to move from one of the finished gears to the following one of a series thereof and to advance all of the finished gears upon forward movement of said slide.

38. The method of meshing a bevel work gear member with a tool gear member in the form of a bevel gear for rotation in mesh, which comprises maintaining the tool gear member in a fixed position with a predetermined rotational orientation, maintaining a rotatable work gear support member having an axis of rotation in a position separated from the tool gear member and in fixed random rotational orientation, locating a work gear member in a fixed position with a predetermined rotational orientation determined by the orientation of said tool gear member in a position separated from the tool gear member and from said work gear support member, transferring the work gear member to a position in axial alignment with but separated from said work gear support member and said tool gear member while maintaining its predetermined rotational orientation, relatively moving the work gear support member, said work gear member, and tool gear member to position said work gear member on said work gear support member and to mesh said gear members while preventing rotation of all three members, and thereafter releasing the tool gear member and the work gear support member for rotation and driving one of the members in rotation.

39. The method of automatically loading a bevel work gear member into a machine for rolling the work gear member in mesh with a conjugate tool gear member, which comprises providing rotatable tool and work spindles with their axes of rotation in angularly spaced relation appropriate for mounting bevel gear members thereon in mesh, and providing for movement of one of the spindles for movement between a first position in which a gear member thereon has its teeth in alignment with the teeth on a gear member on the other spindle but separated therefrom and a second position in which the gear members are in tight mesh, mounting a tool gear fixedly on the tool spindle, fixing the tool spindle in a predetermined rotational position, fixing the work spindle in a random rotational position, locating a work gear member in a predetermined rotational position as required by the predetermined rotational position of the tool gear member to provide for subsequent meshing of said gear members and in a position separated from the work spindle, transferring the work gear member onto the work spindle without disturbing its rotational position, clamping the work gear member against rotation on the work spindle with its teeth properly aligned with the teeth on the tool gear member for subsequent meshing, relatively moving the work and tool spindles without rotation to mesh said gear members, thereafter releasing both of the spindles for rotation and driving one of the spindles in rotation.

40. Apparatus as defined in claim 1 in which said work and tool are in the form of bevel gears.

41. Apparatus as defined in claim 40 in which said bevel gears are hypoid gears.

42. The method of meshing a series of bevel work gear members with a bevel gear-like tool member without tooth interference, which comprises supporting said tool member on a tool spindle in a precisely predetermined rotational position to predetermine the precise position on the teeth thereof, positioning the work gear members serially in a preliminary loading position in which each work gear member is precisely located and occupies a precisely predetermined rotational position, maintaining a rotary work spindle having work engaging means temporarily in a random position of rotation, transferring the work gear members serially from the preliminary loading position to the work spindle without disturbing the rotational position of either the work gears or the work spindle, and securing the work gear members to the work engaging means on the work spindle for rotation therewith, effecting relative approach between the gear and tool members while preventing rotation thereof to mesh the teeth of the members in tight mesh without tooth interference, thereafter releasing the work and tool spindles for rotation, and driving one of the spindles in rotation to thereby drive both spindles through the meshed engagement of gear and tool.

43. The method as defined in claim 42 in which the member driven in rotation is the tool member.

44. The method defined in claim 42 in which one of the members is a bevel ring gear and the other member is a pinion, and in which the relative approach between the members is produced by advancing the ring gear axially toward the bevel gear.

* * * * *